US011902297B2

(12) United States Patent
Gutierrez et al.

(10) Patent No.: US 11,902,297 B2
(45) Date of Patent: Feb. 13, 2024

(54) CONTROLLED MESSAGE ERROR FOR MESSAGE AND ELECTRONIC CONTROL UNIT MAPPING

(71) Applicant: Intel Corporation, Santa Clara, CA (US)

(72) Inventors: Christopher Gutierrez, Hillsboro, OR (US); Shabbir Ahmed, Beaverton, OR (US); Marcio Juliato, Portland, OR (US); Vuk Lesi, Cornelius, OR (US); Manoj Sastry, Portland, OR (US); Qian Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 375 days.

(21) Appl. No.: 17/214,444

(22) Filed: Mar. 26, 2021

(65) Prior Publication Data

US 2021/0218756 A1    Jul. 15, 2021

(51) Int. Cl.
*H04L 29/06* (2006.01)
*H04L 9/40* (2022.01)
*H04L 67/12* (2022.01)
*H04L 12/40* (2006.01)
*B60R 16/023* (2006.01)
*H04L 1/08* (2006.01)
*G06N 20/00* (2019.01)

(52) U.S. Cl.
CPC ...... *H04L 63/1408* (2013.01); *B60R 16/0231* (2013.01); *H04L 1/08* (2013.01); *H04L 12/40143* (2013.01); *H04L 67/12* (2013.01); *G06N 20/00* (2019.01); *H04L 2012/40273* (2013.01)

(58) Field of Classification Search
CPC . H04L 63/1408; H04L 1/08; H04L 12/40143; H04L 67/12; B60R 16/0231
See application file for complete search history.

(56) References Cited

U.S. PATENT DOCUMENTS

2012/0304297 A1    11/2012  Chung et al.
2017/0208076 A1     7/2017  Be'ery et al.
2022/0206551 A1*    6/2022  Jain ...................... G06F 1/3215

OTHER PUBLICATIONS

European Search Report and Written Opinion for the European Patent Application No. EP22151925, dated Jul. 6, 2022, 9 pages.

* cited by examiner

*Primary Examiner* — Jeffrey C Pwu
*Assistant Examiner* — Thong P Truong
(74) *Attorney, Agent, or Firm* — KDW Firm PLLC (57) ABSTRACT

Systems, apparatuses, and methods to establish a mapping between message identifications for messages transmitted on a communication bus and electronic control units transmitting the messages is provided. In particular, retransmission of a low priority message onto the bus is forced such that the retransmitted low priority message overlaps with a higher priority message to determine whether the messages originated from the same ECU.

21 Claims, 9 Drawing Sheets

CONTROLLED MESSAGE ERROR FOR MESSAGE AND ELECTRONIC CONTROL UNIT MAPPING

BACKGROUND

Communication networks are implemented in a variety of modern systems, such as, automotive, bus, train, industrial vehicle, agricultural vehicle, ship, aircraft, spacecraft, manufacturing, industrial, health devices/equipment, retail, or the like. Often, networking protocols are used to facilitate information communication between components in the system. For example, an in-vehicle network (IVN), like a CAN bus, can be used to provide a message-based protocol facilitating communication between electronic control units (e.g., microcontrollers, sensors, actuators, etc.). However, the increasingly high number of electronic control units communicating on such networks can expose the systems to various types of security risks. Thus, identification of the device transmitting a message is important for an overall intrusion detection system (IDS). An IDS may be used to reduce risk of attacks aimed to disable, overtake, reprogram, or otherwise inhibit the safe operation of the system in which the network is deployed, such as, an automobile.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5A illustrates a first example set of messages under examination 500a.

DETAILED DESCRIPTION

Various embodiments of the present disclosure provide for fingerprinting of electronic control units (ECUs) transmitting messages on a communication bus. Conventional fingerprinting techniques require prior knowledge of message identifications (MIDs) for each transmitter of each ECU. Often this information is unavailable or proprietary. As such, the present disclosure provides systems and methods to uncover an ECU to MID mapping. It is noted, that the present disclosure provides an advantage in that the ECU to MID mapping can be uncovered without access to the physical layer.

In general, the present disclosure provides to "force" retransmission of low priority messages to cause an overlap with the expected arrival time of high priority messages. As a result of the forced retransmission and expected overlap with a high priority message, the system and method can determine whether both messages originated from the same ECU or whether the messages originated from different ECUs. Individual ECUs can be fingerprinted based on identifying messages originating from the ECUs and correlating the message IDs, which is described in greater detail below.

As noted, the present disclosure is directed towards fingerprinting ECUs coupled via a communication bus, which can be implemented in a variety of contexts, such as, for example, industrial networks, vehicular networks, manufacturing networks, retail operation networks, warehousing networks, or the like. Although vehicular networks are often used in this description as an example, the claims are not limited to in-vehicle networks.

Using vehicles as an example, modern vehicles have many (often hundreds) of ECUs. These ECUs are communicatively coupled via an in-vehicle network (IVN), such as, CAN bus. For example, there are multiple ECUs for engine control, transmission, airbags, antilock brakes, cruise control, electric power steering, audio systems, power windows, power doors, power mirror adjustment, battery, recharging systems for hybrid/electric cars, environmental control systems, auto start stop systems, blind spot monitoring, lane keeping assist systems, collision avoidance systems, and more complex systems in the case of autonomous, or semi-autonomous vehicles.

ECU fingerprinting schemes are typically used to mitigate the risk of malicious ECUs masquerading as a valid ECU. For example, during operation, the ECUs generate and transmit messages onto the IVN. The present disclosure provides a method to map each message to an ECU. Subsequently, this mapping can be used by a fingerprinting method ensure that messages originating from a particular ECU (e.g., the anti-lock brake ECU, or the like) has indeed originated from the authentic ECU. In many intrusion detection systems (IDS s) machine learning (ML) models are trained to infer, or classify, messages to ECU labels.

The "ground truth" or accuracy of data used to train the ML models is highly correlated to the accuracy of the ML model during actual usage. Accordingly, establishing ground truth for such IDS systems is important for initial training of the ML model. Furthermore, where the system encounters a context shift, the accuracy of the ML model inference may degrade and no longer be valid. Said differently, a change in the physical environment in which the physical characteristics are measured can change the fingerprint of each ECU. For example, an automobile parked overnight will encounter a context shift (e.g., due to changes in temperature, humidity, cooling of vehicle components, or the like) that may affect the fingerprint of the ECUs in the automobile. As such, retraining of the ML model is often required after a context shift.

Establishing ground truth for purposes of training (or retraining) is complicated in that ML based fingerprinting often requires knowledge of all MIDs originating from all ECUs. As stated, this information is often proprietary. For example, the ECUs are often supplied by different manufactures, and as such knowledge of the proprietary information for each ECU in a system (e.g., automobile, or the like) may not be available to a single entity, even the manufacturer of the system itself. Accordingly, initial training as well as retraining (e.g., after a context shift, or the like) of ML models for an IDS is complicated by the fact that establishment of ground truth is not trivial without the above described information, which is often not available.

Accordingly, the present disclosure provides to discover a mapping between ECUs and MIDs (e.g., for initial training of an ML model or for retraining of an ML model) without prior knowledge of all ECU MIDs.

Figure 1:
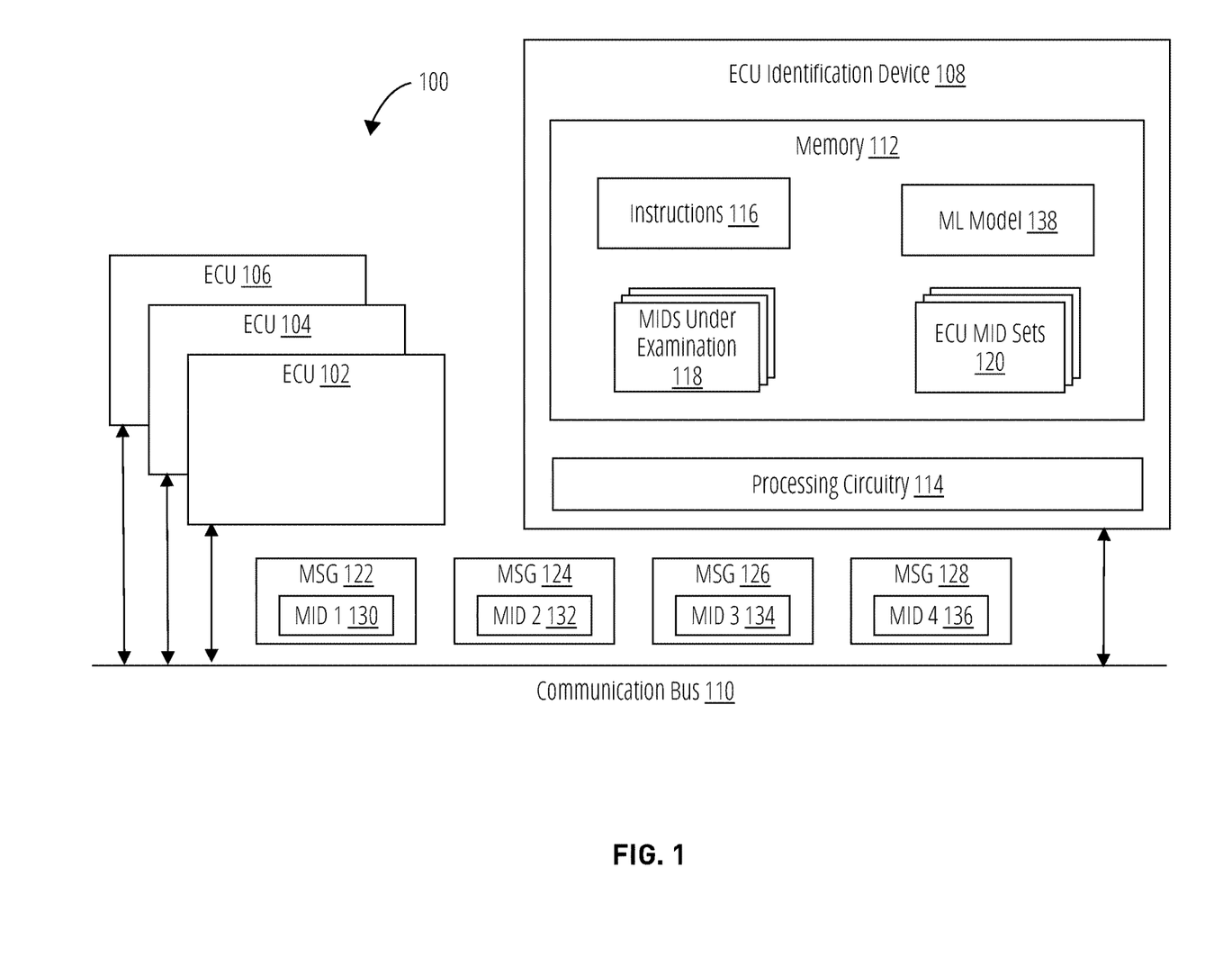
FIG. 1 illustrates a system 100 in accordance with one embodiment.

FIG. 1 illustrates an example system 100, which can be implemented in a vehicle, such as, for example, an automobile, a motorcycle, an airplane, a boat, a personal watercraft, an all-terrain vehicle, or the like. As noted above, the present disclosure is applicable to other systems, besides vehicles, such as, for example, aerospace, industrial, manufacturing, retail, or the like.

System 100 includes a number of electronic control units ECUs 102, 104, and 106. System 100 further includes ECU identification device 108. System 100 includes a communication bus 110, which can be a CAN bus, a FlexRay bus, a CAN FD bus, an automotive ethernet bus, or a local interconnected network (LIN) bus. Additionally, where implemented in contexts outside of the automotive space, the communication bus 110 can be a network bus adapted to the particular implementation, such as, for example, a communication network for manufacturing equipment, or the like.

In general, each of ECUs 102, 104, and 106 include circuitry arranged to generate messages and transmit the messages onto communication bus 110 and/or consume messages from communication bus 110. The depicted ECUs (e.g., ECUs 102, 104, and 106) can be any of a variety of devices, such as, for example, sensor devices, actuator devices, microprocessor control devices, or the like. For example, the ECUs include circuitry arranged to manipulate voltage levels on communication bus 110 to communicate messages via the communication bus 110. As depicted, system 100 includes three (3) ECUs. This is done for clarity of presentation. However, in practice (e.g., in a modern automobile, or the like) hundreds of ECUs may be provided in system 100.

ECUs are arranged to generate and/or consume messages, where the messages can include data or commands. Specifically, ECUs 102, 104, and 106 can convey messages via communication bus 110. As such, messages are depicted on communication bus 110. In particular, this figure depicts a number of (MSGs), such as, messages 122, 124, 126, and 128. The number of messages is depicted for purposes of clarity and ease of explanation. Many IVN standards, however, do not provide for indicating source information on the bus. Furthermore, many IVN schemes do not have sufficient bandwidth for conventional cryptography techniques useful to indicate the source of messages.

As such, messages 122, 124, 126, and 128 often include a message identification (MID) with which receivers can determine whether the message is relevant or not. In particular, message 122 is depicted including MID 1 130, message 124 is depicted including MID 2 132, message 126 is depicted including MID 3 134, and message 128 is depicted including MID 4 136.

ECU identification device 108 includes memory 112, and processing circuitry 114. Memory 112 includes instructions 116 (e.g., firmware, or the like) that can be executed by processing circuitry 114. During operation, processing circuitry 114 can execute instructions 116 to consume messages (e.g., message 122, etc.) from communication bus 110 and to generate a set of messages under examination 118 from the MID of each consumed message. Furthermore, processing circuitry 114 can execute instructions 116 to generate a mapping between ECUs and MIDs, represented at ECU message ID sets 120. As noted above, the mapping between ECUs and MIDs is often used by an IDS to monitor message traffic on communication bus 110. In some examples, machine learning (ML) is used. As such, ML model 138 is depicted. ML model 138 can be trained (or retrained as may be the case) based on the ECU message ID sets 120, or rather, the mapping between ECUs and MIDs.

Processing circuitry 114 can include any of a variety of processors, such as, for example, commercial central processing units, application specific integrated circuits, or the like. Processing circuitry 114 can be a microprocessor or a commercial processor and can include one or multiple processing core(s) and can also include cache.

Memory 112 can be based on any of a wide variety of information storage technologies. For example, memory 112 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 112 can include storage devices.

ML model 138 can be any of a variety of machine learning models, decision trees, classification schemes, or the like. For example, ML model 138 can be a random forest model, a support vector machine, or a neural network.

Figure 2:
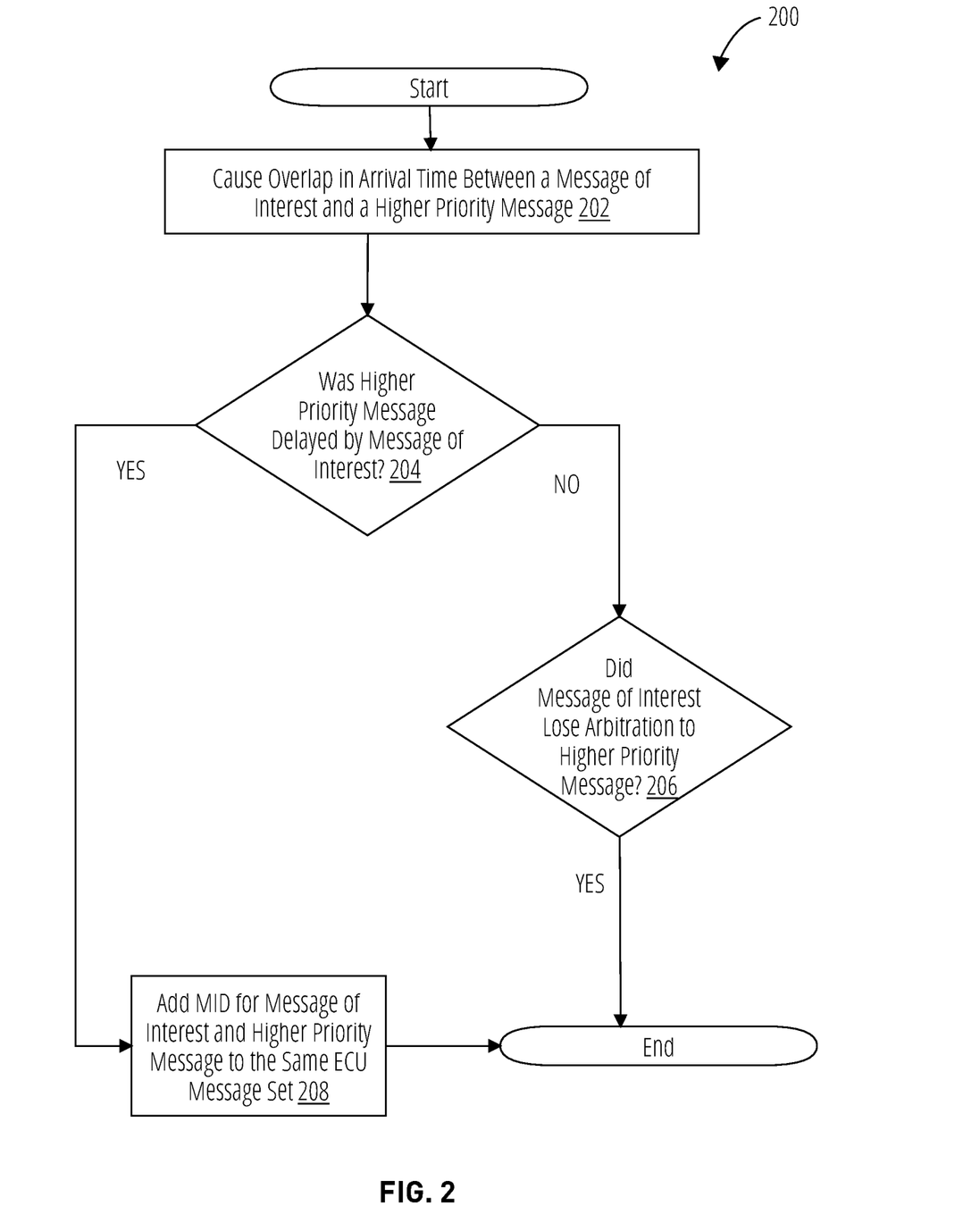
FIG. 2 illustrates a routine 200 to determine whether messages originated from the same ECU, in accordance with non-limiting example(s) of the present disclosure.
Figure 4:
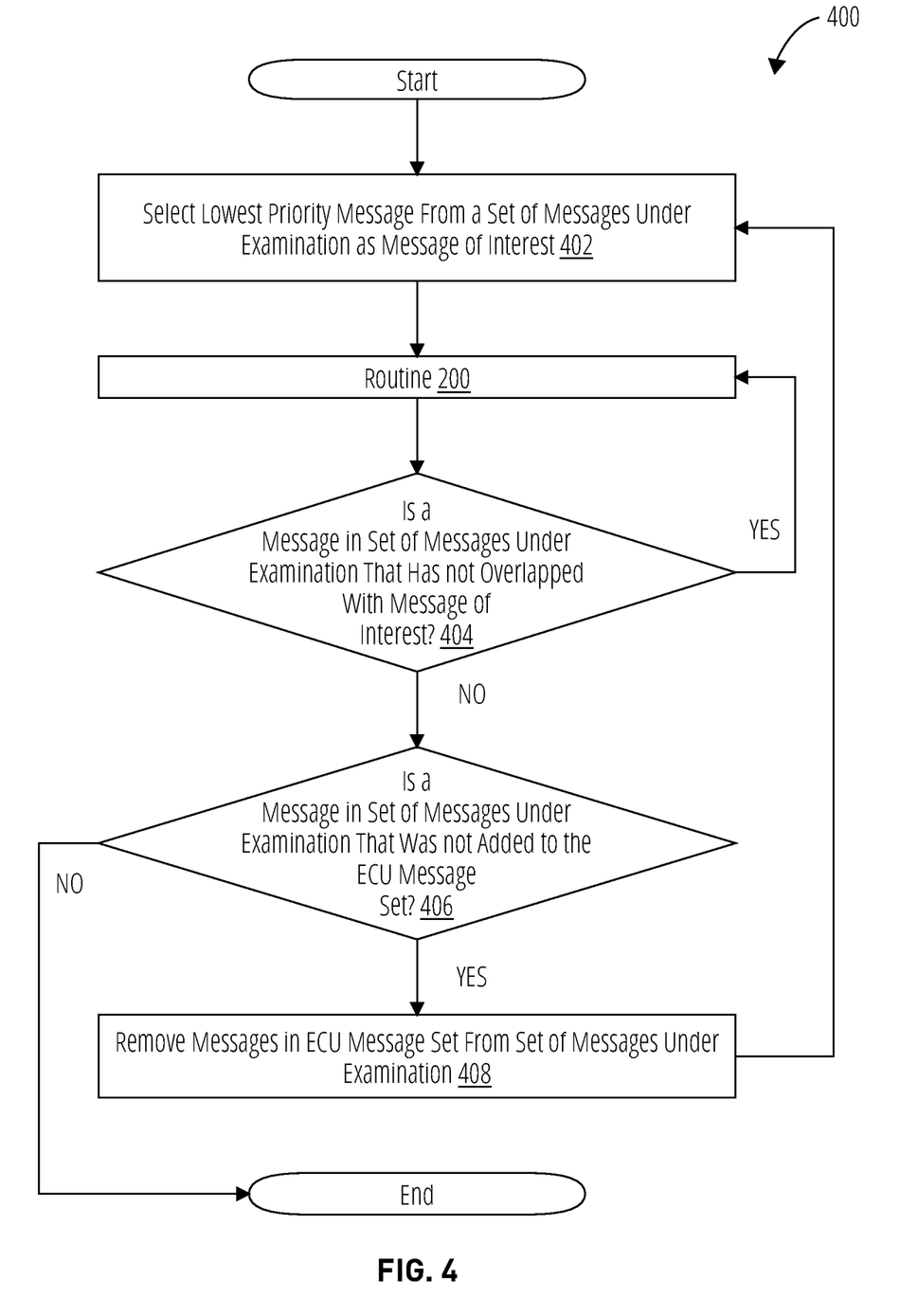
FIG. 4 illustrates a routine 400 to determine a mapping between ECUs and MIDs of messages transmitted on a communication bus, in accordance with non-limiting example(s) of the present disclosure.

FIG. 2 depicts a routine 200. Routine 200 can be implemented by an intrusion detection system (IDS), such as ECU identification device 108, to determine whether a low priority message originated from the same ECU as a higher priority message. Often, routine 200 can be implemented as part of a larger routine to determine a mapping between ECUs and MIDs without accessing the physical layer and without prior knowledge of a similar mapping. Said differently, routine 200 can be implemented as part of a larger routine to establish ground truth for an IDS system, such as may be used to train an ML model (e.g., ML model 138, or the like). FIG. 4 depicts such a larger routine (e.g., routine 400) and is described in greater detail below.

The routines and logic flows described herein, including routine 200, routine 400, and other logic flows or routines described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Routine 200 is described with reference to FIG. 3A, FIG. 3B, FIG. 3C, and FIG. 3D. These figures depict hypothetical message traffic on a communication bus for purposes of describing forcing overlap in messages as detailed herein.

Figure 3A:
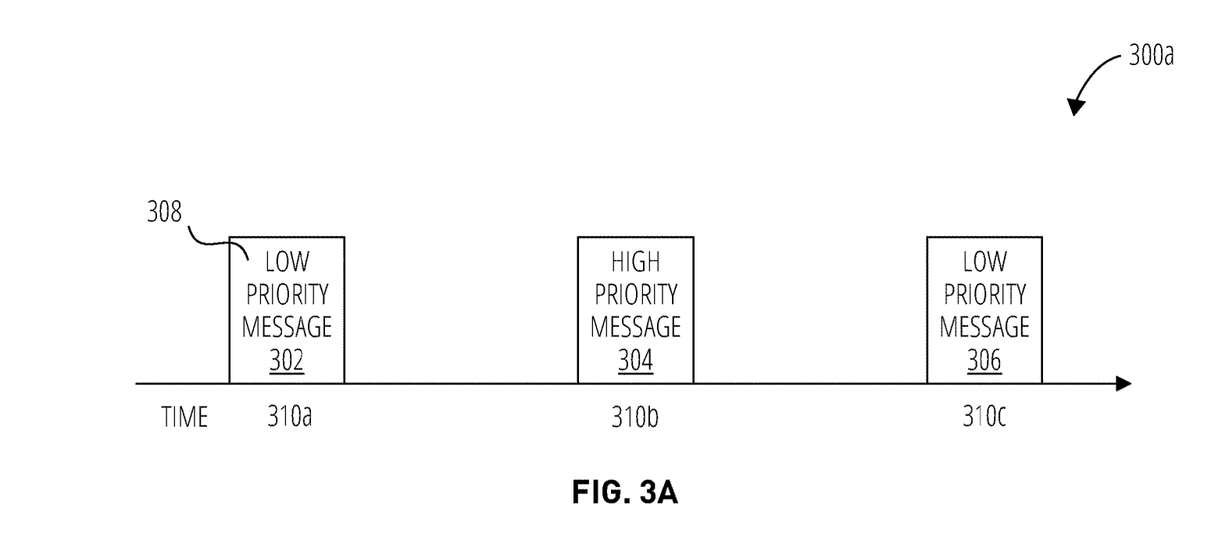
FIG. 3A illustrates a first example of bus traffic 300a on a communication bus, in accordance with non-limiting example(s) of the present disclosure.

In particular, FIG. 3A depicts bus traffic 300a showing conventional bus traffic. As described above, a number of messages can be transmitted on a communication bus (e.g., communication bus 110, or the like). Using the CAN bus as an example, message traffic is periodic. That is, messages are transmitted at a set frequency. For example, bus traffic 300a depicts low priority message 302, high priority message 304, and low priority message 306 being transmitted at times time 310a, time 310b, and time 310c, respectively. It is noted that the messages depicted in FIG. 3A and FIG. 3B can be like messages described above with respect to system 100 and FIG. 1 (e.g., message 122, message 124, message 126, message 128, etc.)

As depicted in FIG. 3A, messages may have varying priority. For example, low priority message 302 and high low priority message 306 can be lower priority than high priority message 304. In some examples, messages transmitted on a communication bus may have a field indicating a priority of the message, for example, to avoid collisions or to facilitate arbitration between multiple ECUs transmitting at once. As a specific example, messages transmitted on the CAN bus have a priority defined by an arbitration field in the message ID header.

For purposes of the present disclosure, one of the lower priority messages can be selected as a messages of interest. For example, low priority message 302 is depicted as message of interest 308. As used herein, a "message of interest" is a message transmitted on the bus with which routine 200 is attempting to determine what other messages originated from the same ECU, in order to generate a mapping between ECUs and MIDs (e.g., ECU message ID sets 120, or the like) as detailed herein.

Routine 200 may begin at block 202. At block 202 "cause overlap in arrival time between a message of interest and a higher priority message" circuitry can consume messages (e.g., message 122, etc.) from communication bus 110 and can "force" retransmission of a lower priority message to influence the arrival time of the retransmitted lower priority message to overlap with a higher priority message. As used herein, a higher priority message implies that the message has higher priority than the message of interest. The terms higher and lower are merely used to describe the relationship between priorities of the message being forced to retransmit and the message with which the retransmitted message is being forced to overlap with.

For example, ECU identification device 108 can issue a controlled message error 312 to cause message of interest 308 (e.g., low priority message 302) to retransmit on the bus such that low priority message 302 overlaps or collides with a higher priority message (e.g., high priority message 304).

Figure 3B:
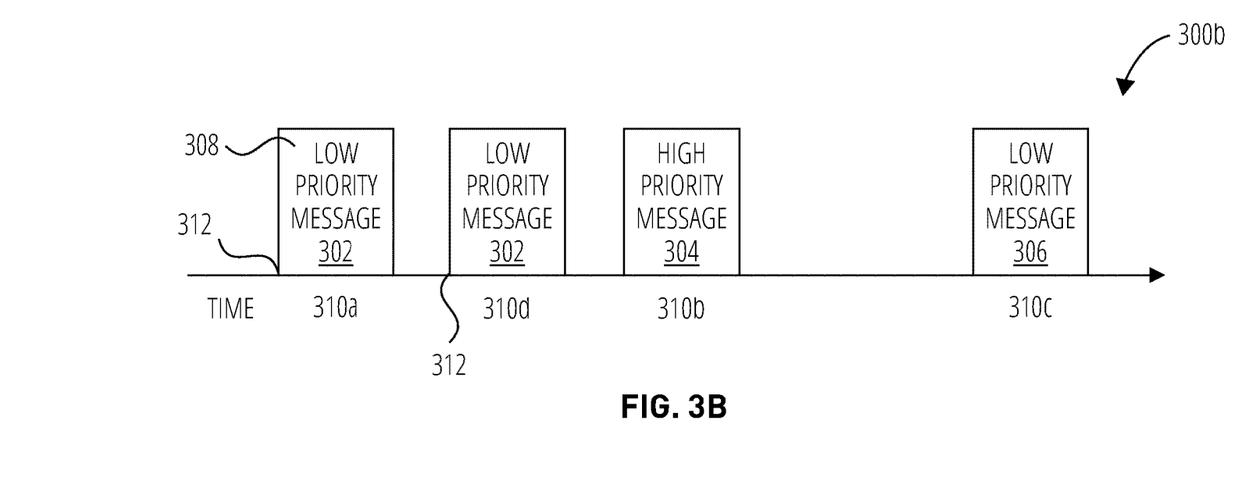
FIG. 3B illustrates a second example of bus traffic 300b on a communication bus, in accordance with non-limiting example(s) of the present disclosure.

FIG. 3B depicts bus traffic 300b showing controlled message error 312 issued to low priority message 302 (e.g., the message of interest 308) at time 310a causing low priority message 302 be retransmitted at time 310d and issue another controlled message error 312 to the low priority message 302 at time 310d such that the message of interest 308 will eventually collide or overlap with high priority message 304. As a more specific example, processing circuitry 114 of ECU identification device 108, in executing instructions 116, can issue a controlled message error. For example, processing circuitry 114 can issue a command, notification, flag, or the like comprising an indication that the message of interest 308 was not received correctly.

With some examples, the frequency of controlled message error 312 issued by processing circuitry 114 can be based on policy where overlap between message of interest 308 and a higher priority message is desired but forcing ECUs off the bus is avoided. For example, the controlled message error 312 should not cause retransmission of messages such that ECUs no longer meet latency requirements or such that ECUs are forced into a "bus-off" state.

Figure 3C:
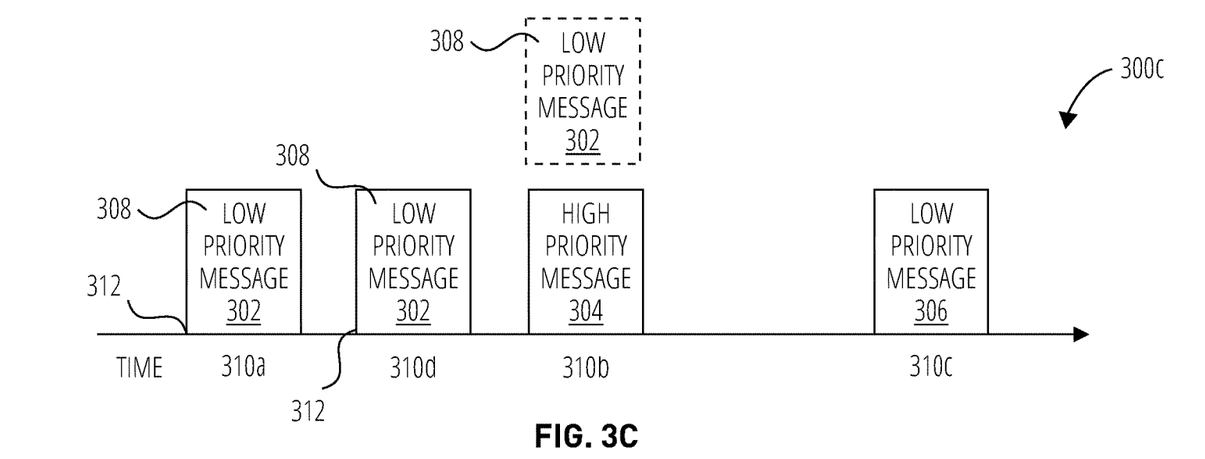
FIG. 3C illustrates a third example of bus traffic 300c on a communication bus, in accordance with non-limiting example(s) of the present disclosure.
Figure 3D:
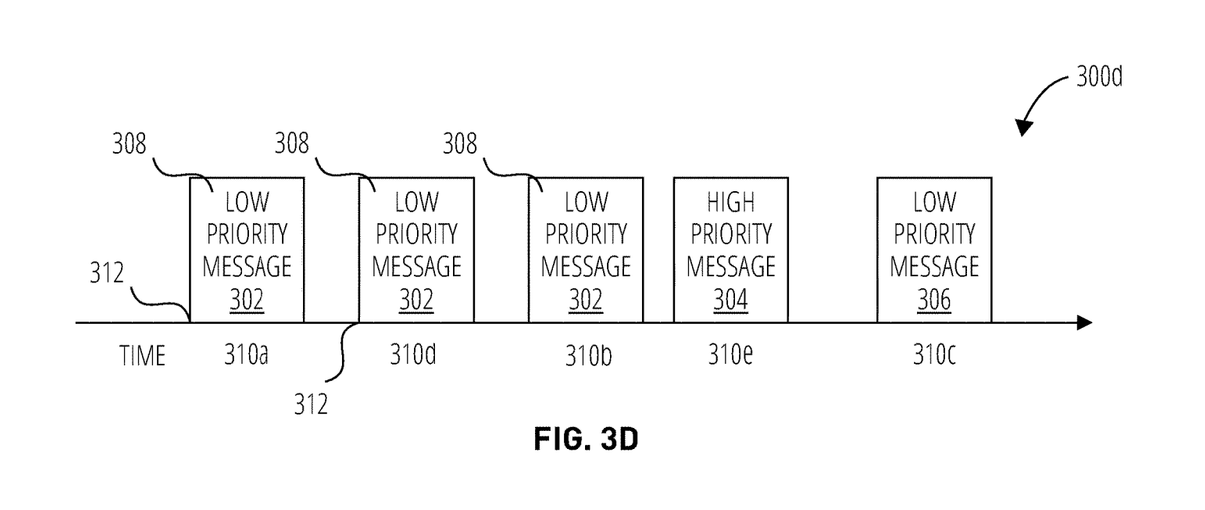
FIG. 3D illustrates a fourth example of bus traffic 300d on a communication bus, in accordance with non-limiting example(s) of the present disclosure.

Continuing to decision block 204 "was higher priority message delayed by message of interest?" circuitry determines whether the higher priority message was delayed by the message of interest. For example, processing circuitry 114 in executing instructions 116, can determine whether the higher priority message (e.g., high priority message 304) was delayed by the message of interest 308 (e.g., low priority message 302) FIG. 3D depicts bus traffic 300d illustrating low priority message 302 (e.g., message of interest 308) arriving before high priority message 304. More particularly, transmission of the high priority message 304 at time 310e is delayed from the expected time (e.g., time 310b) as the message of interest 308 was transmitted at that time, indicating that they are transmitted by the same ECU.

From decision block 204, routine 200 can continue to either decision block 206 or block 208. For example, routine 200 can continue from decision block 204 to decision block 206 based on a determination at decision block 204 that the higher priority message (e.g., high priority message 304) was not delayed by the message of interest 308 (e.g., low priority message 302), while routine 200 can continue to block 208 from decision block 204 based on a determination at decision block 204 that transmission of the higher priority message (e.g., high priority message 304) was delayed by transmission of the message of interest 308 (e.g., low priority message 302).

At decision block 206 "did message of interest lose arbitration to higher priority message?" circuitry determines whether the message of interest lost arbitration to the higher priority message. For example, processing circuitry 114 in executing instructions 116, can determine whether the message of interest 308 (e.g., low priority message 302) lost arbitration to the higher priority message (e.g., high priority message 304). FIG. 3C depicts bus traffic 300c illustrating low priority message 302 (e.g., message of interest 308) losing arbitration to high priority message 304 (e.g., the higher priority message to message of interest 308) at time 310b. More particularly, message of interest 308 (e.g., low priority message 302 is transmitted at time 310b while high priority message 304 is also transmitted at time 310b. As they are both transmitted at the same time, indicating that they are transmitted by different ECUs, an arbitration will take place and the higher priority message (e.g., high priority message 304) will win the arbitration. Said differently, the lower priority message (e.g., message of interest 308) will lose the arbitration to the high priority message 304.

From decision block 206, routine 200 can end. For example, routine 200 can end after a determination at decision block 206 that the message of interest 308 (e.g., low priority message 302) did lose arbitration to the higher priority message (e.g., high priority message 304). Optionally, routine 200 can also end based on a determination at decision block 206 that the message of interest did not lose arbitration with the higher priority message. For example, where arbitration between the message of interest 308 and the higher priority message (e.g., high priority message 304) is initiated, it is assumed that the messages are transmitted at the same (or similar) times and as such, did not originate from the same ECU.

At bock block 208 "add MID for message of interest and higher priority message to the same ECU message set" circuitry adds indications of the message of interest 308 (e.g., low priority message 302) and the high priority message 304 to ECU message ID sets 120. Said differently, based on a determination at decision block 204 that the higher priority message was delayed by the message of interest 308, it is assumed that the messages originated from the same ECU. As such, the MIDs associated with these messages are associated with the same ECU via ECU message ID sets 120. For example, processing circuitry 114 in executing instructions 116, can add indications of MIDs for message of interest 308 (e.g., low priority message 302) and high priority message 304 to a one of ECU message ID sets 120 associated with the ECU message of interest 308. Where the ECU for message of interest 308 is unknown, a new set of ECU message ID sets 120 can be created for this ECU.

Conversely, where based on a determination at decision block 204 that the higher priority message (e.g., high priority message 304) was not delayed by the message of interest 308 and a determination at decision block 206 that the message of interest 308 did lose arbitration to the higher priority message (e.g., high priority message 304), it is assumed that the messages did not originate from the same ECU. As such, the MIDs associated with these messages are not associated with the same ECU via ECU message ID sets 120 and routine 200 can end.

As noted, FIG. 4 illustrates a routine 400 that can be implemented to identify, discover, or determine a mapping between ECUs and MIDs of messages transmitted on a communication bus. In some example, routine 200 can be implemented in a non-adversarial environment (e.g., original equipment manufacturer setting, or the like) where it is assumed that all ECUs are valid. In other examples, routine 200 can be implemented in an adversarial environment (e.g., where it is unknown if malicious ECUs exist or not). Examples are not limited in this respect.

Routine 400 can begin at block 402 "select lowest priority message from a set of messages under examination as message of interest" circuitry can identify the lowest priority message from a set of messages under examination. For example, processing circuitry 114 in executing instructions 116 can identify the lowest priority message from set of messages under examination 118.

Figure 5A:
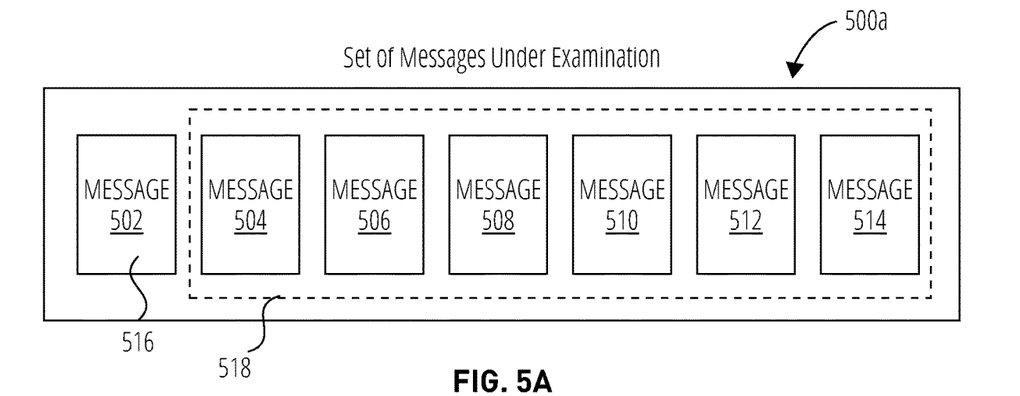

FIG. 5A illustrates an example set of messages under examination 500a including a number of messages message 502, 504, 506, 508, 510, 512, 514. At block 402, processing circuitry 114 can execute instructions 116 to identify one of the messages from set of messages under examination 500a as the message having the lowest priority. For example, message 502 is illustrated in FIG. 5A as the message having the lowest priority (e.g., lowest priority message 516). This message (e.g., message 502) can be set as the message of interest (e.g., message of interest 308, or the like) while the other messages (e.g., message 504, etc.) can be labeled as higher priority messages 518.

Returning to FIG. 4, routine 400 can continue from block 402 to execute routine 200. For example, routine 200 can be executed to cause the lowest priority message (e.g., message 502), which is designated as the message of interest (e.g., message 502), to overlap with messages from the higher priority messages 518 to determine whether the message of interest (e.g., message 502) originated from the same ECU as ones of the higher priority messages 518.

It is noted that routine 400 provides to iteratively execute routine 200, in order to cause the message of interest (e.g., message 502) to overlap with each of the higher priority messages 518. To that end, from routine 200 in routine 400, routine 400 can continue to decision block 404 "is there a message in the set of messages under examination that has not overlapped with the message of interest?" circuitry can determine whether there is a message in the set of messages under examination 500a (or more specifically, whether one of the higher priority messages 518 has not overlapped with the message of interest (e.g., message 502).

From decision block 404, routine 400 can either re-execute routine 200, for example, to cause the message of interest to overlap with another one of the higher priority messages 518 or can continue to decision block 406. In particular, routine 400 can return to routine 200 from decision block 404 based on a determination that there are messages (e.g., ones of higher priority messages 518) in the set of messages under examination 500a that have not overlapped with the lowest priority message (e.g., message 502). Alternatively, routine 400 can continue to decision block 406 from decision block 404 based on a determination that there are not messages (e.g., ones of higher priority messages 518) in the set of messages under examination 500a that have not overlapped with the lowest priority message (e.g., message 502).

Figure 5B:
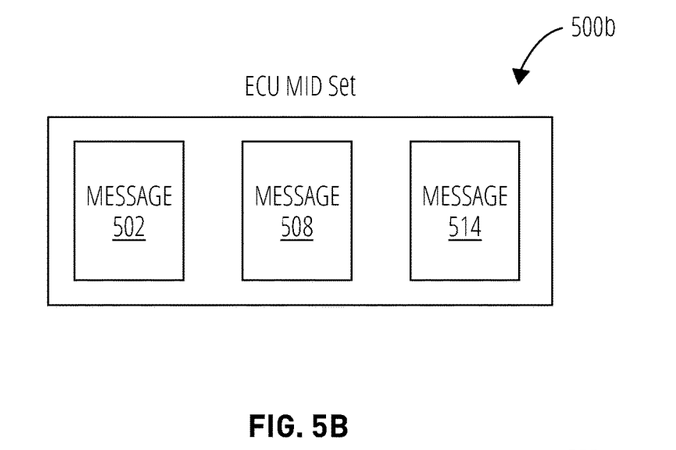
FIG. 5B illustrates an example ECU message ID set 500b.

At decision block 406 "is there a message in the set of messages under examination that was not added to the ECU message set?" circuitry can determine whether messages in the set of messages under examination 500a (or rather higher priority messages 518) that were not added to the ECU message ID set as part of routine 200. For example, as detailed earlier, routine 200 determines whether a lower priority message originated from the same ECU as a higher priority message, and if so, links or maps the MIDs for these messages to the same ECU, for example, via indications of MIDs in ECU message ID sets 120. Accordingly, FIG. 5B illustrates an example ECU message ID set 500b depicting messages message 502, message 508, and message 514 mapped to the same ECU. That is, assuming based on one iterative execution of routine 200 during routine 400, that it is determined that message 502, message 508, and message 514 originated from the same ECU then ECU message ID set 500b can be created to map the MIDs for these messages to the same ECU.

From decision block 406, routine 400 can continue to either block 408 or can end. In particular, from decision block 406, routine 400 can continue to block 408 based on a determination that messages in the set of messages under examination 500a were not added to an ECU message ID set, while routine 400 can end after decision block 406 based on a determination that all messages in the set of messages under examination 500a were added to an ECU message ID set.

Figure 5C:
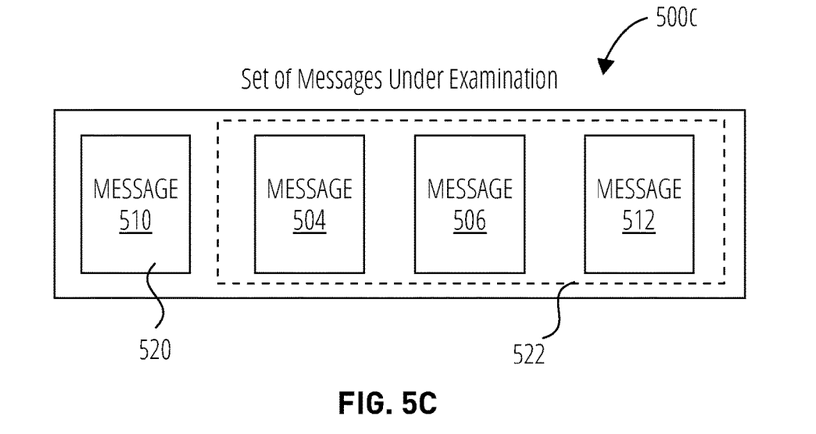
FIG. 5C illustrates a second example set of messages under examination 500c.

At block 408 "remove messages in the ECU message set from message under examination" circuitry can remove messages that are in an ECU message set from the messages under examination. For example, processing circuitry 114 in executing instructions 116 can remove from the messages under examination (set of messages under examination 118, or the like) messages that were added to ECU message ID sets 120. As a specific example, FIG. 5C illustrates set of messages under examination 500c where message 502, message 508, and message 514, which were previously added to ECU message ID set 500b, have been removed, leaving message 504, message 506, message 510, and message 512 in the set of messages under examination 500c. From block 408, routine 400 can return to block 402 where the remaining lowest priority message (e.g., message 510) is designated at lowest priority message 520 and the remaining messages in set of messages under examination 500c are designated as higher priority messages 522 and routine 200 is iteratively executed again to determine whether lowest priority message 520 originated from the same ECU as any one of the higher priority messages 522 based on causing the lowest priority message 520 to overlap with ones of the higher priority messages 522 as outlined herein.

Figure 6:
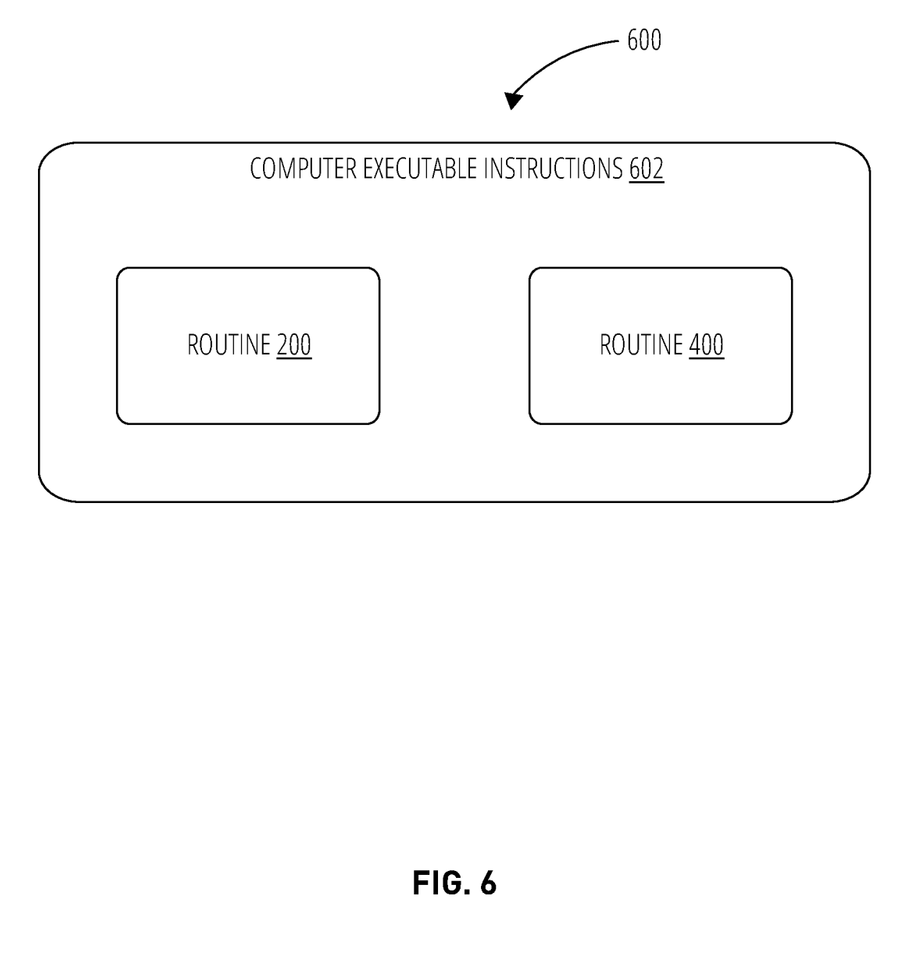
FIG. 6 illustrates a storage device 600 in accordance with one embodiment.

FIG. 6 illustrates an example of a storage device 600. Storage device 600 may comprise an article of manufacture, such as, any non-transitory computer readable medium or machine readable medium, such as an optical, magnetic or semiconductor storage. Storage device 600 may store various types of computer executable instructions 602, such as instructions to implement routine 200 and/or routine 400. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
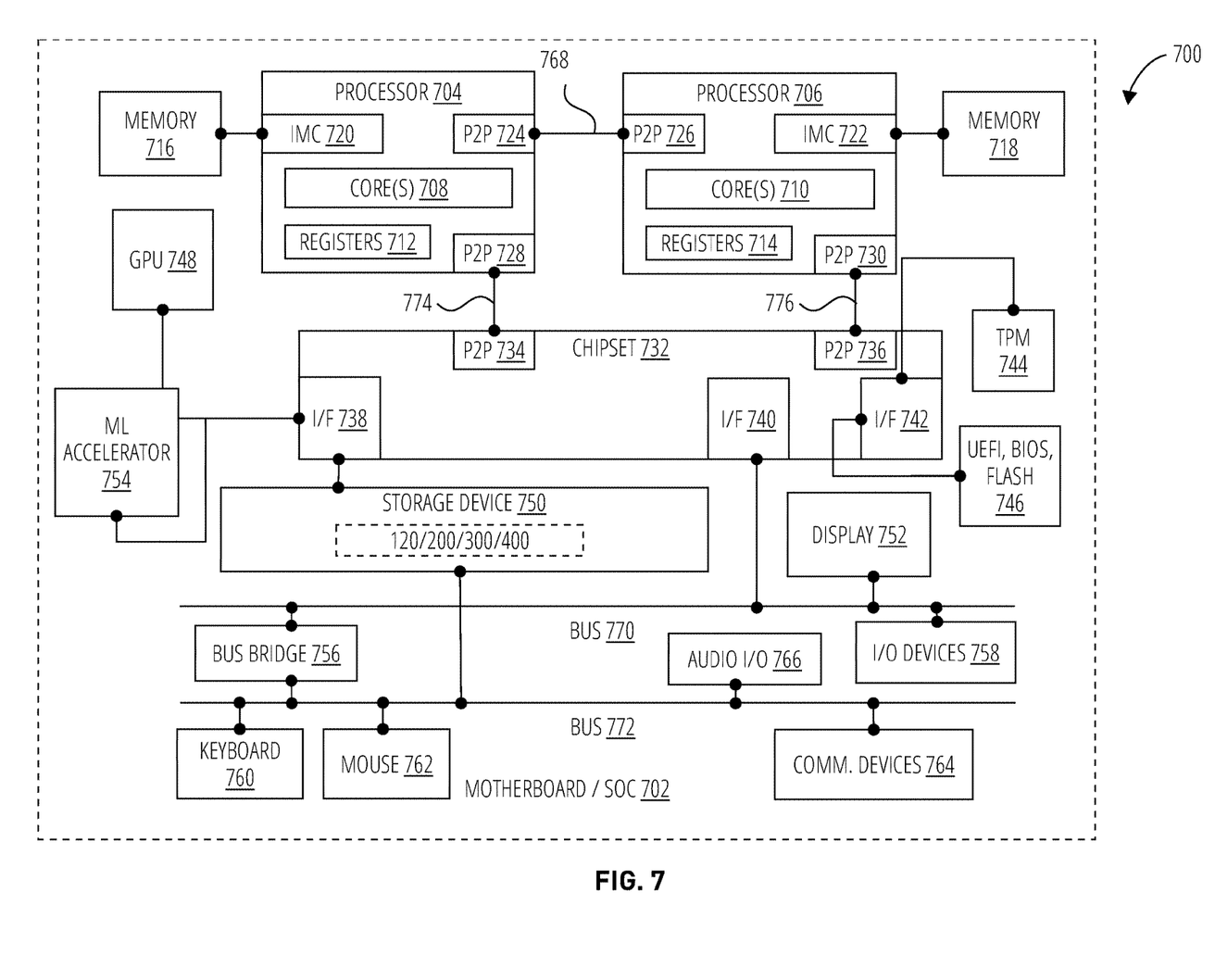
FIG. 7 illustrates a system 700, in accordance with non-limiting example(s) of the present disclosure.

FIG. 7 illustrates an embodiment of a system 700. System 700 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 700 may have a single processor with one core or more than one processor. Note that the term "processor" refers to a processor with a single core or a processor package with multiple processor cores. In at least one embodiment, the computing system 700 is representative of the components of the system 100. More generally, the computing system 700 is configured to implement all logic, systems, logic flows, methods, apparatuses, and functionality described herein.

As used in this application, the terms "system" and "component" and "module" are intended to refer to a computer-related entity, either hardware, a combination of hardware and software, software, or software in execution, examples of which are provided by the exemplary system 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 700 comprises a motherboard or system-on-chip (SoC) 702 for mounting platform components. Motherboard or system-on-chip (SoC) 702 is a point-to-point (P2P) interconnect platform that includes a first processor 704 and a second processor 706 coupled via a point-to-point interconnect 768 such as an Ultra Path Interconnect (UPI). In other embodiments, the system 700 may be of another bus architecture, such as a multi-drop bus. Furthermore, each of processor 704 and processor 706 may be processor packages with multiple processor cores including core(s) 708 and core(s) 710, respectively as well as one or more registers, such as registers 712 and 714, respectively. While the system 700 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 704 and chipset 732. Some platforms may include additional components and some platforms may only include sockets to mount the processors and/or the chipset. Furthermore, some platforms may not have sockets (e.g. SoC, or the like).

The processor 704 and processor 706 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi processor architectures may also be employed as the processor 704 and/or processor 706. Additionally, the processor 704 need not be identical to processor 706.

Processor 704 includes an integrated memory controller (IMC) 720 and point-to-point (P2P) interface 724 and P2P interface 728. Similarly, the processor 706 includes an IMC 722 as well as P2P interface 726 and P2P interface 730. IMC 720 and IMC 722 couple the processors processor 704 and processor 706, respectively, to respective memories (e.g., memory 716 and memory 718). Memory 716 and memory 718 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 716 and memory 718 locally attach to the respective processors (i.e., processor 704 and processor 706). In other embodiments, the main memory may couple with the processors via a bus and shared memory hub.

System 700 includes chipset 732 coupled to processor 704 and processor 706. Furthermore, chipset 732 can be coupled to storage device 750, for example, via an interface (I/F) 738. The I/F 738 may be, for example, a Peripheral Component Interconnect-enhanced (PCI-e).

Processor 704 couples to a chipset 732 via P2P interface 728 and P2P 734 while processor 706 couples to a chipset 732 via P2P interface 730 and P2P 736. Direct media interface (DMI) 774 and DMI 776 may couple the P2P interface 728 and the P2P 734 and the P2P interface 730 and P2P 736, respectively. DMI 774 and DMI 776 may be a high-speed interconnect that facilitates, e.g., eight Giga Transfers per second (GT/s) such as DMI 3.0. In other embodiments, the processor 704 and processor 706 may interconnect via a bus.

The chipset 732 may comprise a controller hub such as a platform controller hub (PCH). The chipset 732 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 732 may comprise more than one controller hub such as a chipset with a memory controller hub, a graphics controller hub, and an input/output (I/O) controller hub.

In the depicted example, chipset 732 couples with a trusted platform module (TPM) 744 and UEFI, BIOS, FLASH circuitry 746 via I/F 742. The TPM 744 is a dedicated microcontroller designed to secure hardware by integrating cryptographic keys into devices. The UEFI, BIOS, FLASH circuitry 746 may provide pre-boot code.

Furthermore, chipset 732 includes the I/F 738 to couple chipset 732 with a high-performance graphics engine, such as, graphics processing circuitry or a graphics processing unit (GPU) 748. In other embodiments, the system 700 may include a flexible display interface (FDI) (not shown) between the processor 704 and/or the processor 706 and the chipset 732. The FDI interconnects a graphics processor core in one or more of processor 704 and/or processor 706 with the chipset 732. Additionally, ML accelerator 754 coupled to chipset 732 via I/F 738. ML accelerator 754 can be circuitry arranged to execute ML related operations (e.g., training, inference, etc.) for ML models. In particular, ML accelerator 754 can be arranged to execute mathematical operations and/or operands useful for machine learning.

Various I/O devices 758 and display 752 couple to the bus 770, along with a bus bridge 756 which couples the bus 770 to a second bus 772 and an I/F 740 that connects the bus 770 with the chipset 732. In one embodiment, the second bus 772 may be a low pin count (LPC) bus. Various devices may couple to the second bus 772 including, for example, a keyboard 760, a mouse 762 and communication devices 764.

Furthermore, an audio I/O 766 may couple to second bus 772. Many of the I/O devices 758 and communication devices 764 may reside on the motherboard or system-on-chip (SoC) 702 while the keyboard 760 and the mouse 762 may be add-on peripherals. In other embodiments, some or all the I/O devices 758 and communication devices 764 are add-on peripherals and do not reside on the motherboard or system-on-chip (SoC) 702.

Figure 8:
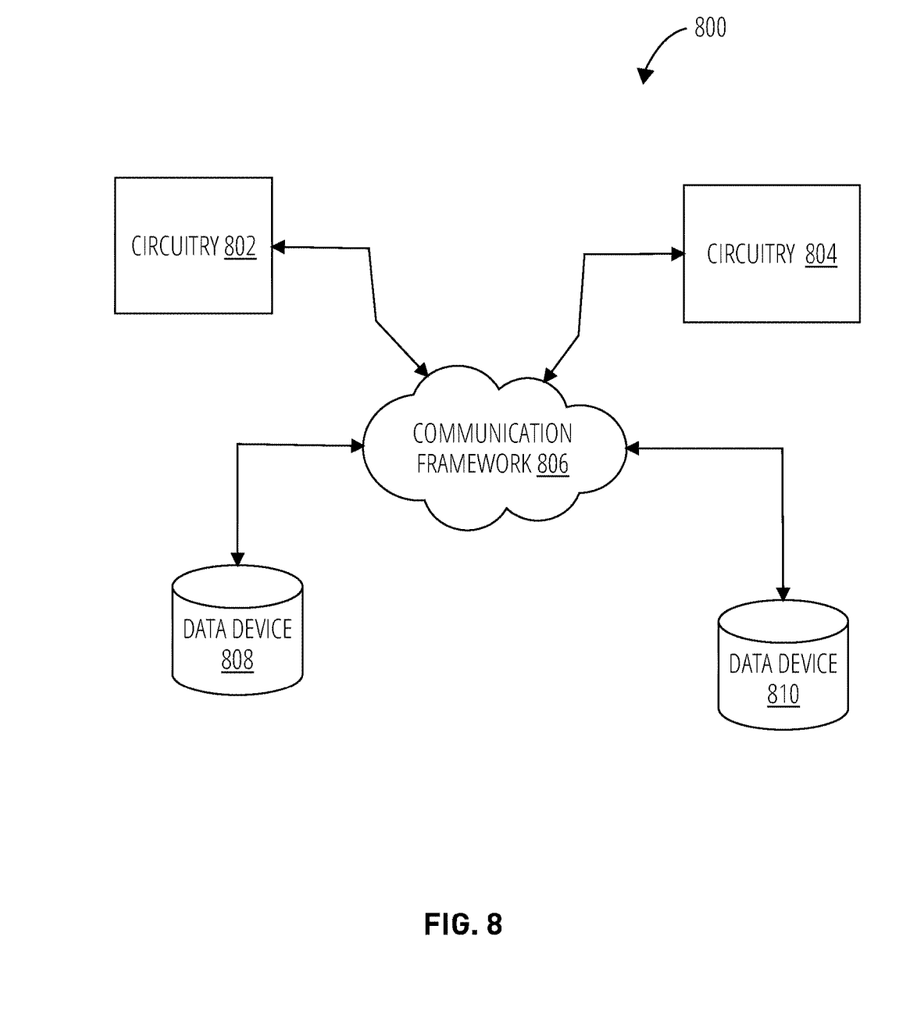
FIG. 8 illustrates an in-vehicle communication architecture 800 in accordance with one embodiment.

FIG. 8 illustrates an in-vehicle communication architecture 800 according to one or more embodiments of the disclosure. For example, one or more vehicular devices, components, or circuits, such as circuitry 802 and/or circuitry 804, may communicate with each other via a communication framework 806, which may be an in-vehicle network, such as a CAN bus, implemented to facilitate establishing ground truth for an IDS based on collapsing overlapping MID voltage signatures into a single ECU label.

The in-vehicle communication architecture 800 includes various common communications elements, such as a transmitter, receiver, transceiver, and so forth. The embodiments, however, are not limited to implementation by the in-vehicle communication architecture 800. As shown in this figure, the vehicular circuitry 802 and circuitry 804 may each be operatively connected to one or more respective data devices, such as, data device 808 and/or data device 810 that can be employed to store information local to the respective circuitry 802 and/or circuitry 804, such as fingerprints, distributions, densities, voltage signals, or the like. It may be understood that the circuitry 802 and circuitry 804 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 806 in a vehicle.

Further, the communication framework 806 may implement any well-known communications techniques and protocols. As described above, the communication framework 806 may be implemented as a CAN bus protocol or any other suitable in-vehicle communication protocol. The communication framework 806 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 806 may employ both wired and wireless connections.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

The disclosure now turns to providing some examples.

Example 1. A computing apparatus comprising: a processor coupled to a communication bus; and memory storing instructions, which when executed by the processor configure the apparatus to: identify a first message from a plurality of messages transmitted on the communication bus as a low priority message; determine whether the low priority message and second message from the plurality of messages originated from a first electronic control unit (ECU) coupled to the communication bus, the second message a higher priority message than the low priority message; and associate a message identification (MID) of the low priority message and an MID of the higher priority message to the first ECU.

Example 2. The computing apparatus of example 1, the instructions when executed by the processor configure the apparatus to issue at least one controlled message error on the communication bus against the low priority message to force the low priority message to be retransmitted to cause an overlap between transmission of the low priority message and the higher priority message.

Example 3. The computing apparatus of example 2, the instructions when executed by the processor configure the apparatus to: determine whether the low priority message lost an arbitration, responsive to the overlap, with the higher priority message; and determine that the low priority message and the higher priority message did not originate from the first ECU based on a determination that the low priority message did lose an arbitration, responsive to the overlap, with the higher priority message.

Example 4. The computing apparatus of example 3, the instructions when executed by the processor configure the apparatus to: determine whether, responsive to the overlap, the high priority message was delayed by the low priority; and determine that the low priority message and the higher priority message did originate from the first ECU based on a determination that the high priority message was delayed by the low priority message.

Example 5. The computing apparatus of example 3, the instructions when executed by the processor configure the apparatus to: issue at least one secondary controlled message errors on the communication bus against the low priority message to force the low priority message to be retransmitted to cause an overlap between transmission of the low priority message and a third message the plurality of messages, the third message another higher priority message than the low priority message; determine whether the low priority message lost an arbitration, responsive to the overlap, with the other higher priority message; and determine that the low priority message and the other higher priority message did not originate from the first ECU based on a determination that the low priority message did lose an arbitration, responsive to the overlap, with the other higher priority message.

Example 6. The computing apparatus of example 1, the instructions when executed by the processor configure the apparatus to ingest the plurality of messages from the communication bus.

Example 7. The computing apparatus of example 1, wherein the communication bus is an in-vehicle network.

Example 8. A method, comprising: identifying, by processing circuitry coupled to a communication bus, a first message from a plurality of messages transmitted on the communication bus as a low priority message; determining, by the processing circuitry, whether the low priority message and second message from the plurality of messages originated from a first electronic control unit (ECU) coupled to the communication bus, the second message a higher priority message than the low priority message; and associating, by the processing circuitry via an ECU message identification (MID) set, an MID of the low priority message and an MID of the higher priority message to the first ECU.

Example 9. The method of example 8, comprising issuing at least one controlled message error on the communication bus against the low priority message to force the low priority message to be retransmitted to cause an overlap between transmission of the low priority message and the higher priority message.

Example 10. The method of example 9, comprising: determining whether the low priority message lost an arbitration, responsive to the overlap, with the higher priority message; and determining that the low priority message and the higher priority message did not originate from the first ECU based on a determination that the low priority message did lose an arbitration, responsive to the overlap, with the higher priority message.

Example 11. The method of example 10, comprising determining whether, responsive to the overlap, the high priority message was delayed by the low priority; and determining that the low priority message and the higher priority message did originate from the first ECU based on a determination that the high priority message was delayed by the low priority message.

Example 12. The method of example 10, comprising: issuing at least one secondary controlled message errors on the communication bus against the low priority message to force the low priority message to be retransmitted to cause an overlap between transmission of the low priority message and a third message the plurality of messages, the third message another higher priority message than the low priority message; determining whether the low priority message lost an arbitration, responsive to the overlap, with the other higher priority message; and determining that the low priority message and the other higher priority message did not originate from the first ECU based on a determination that the low priority message did lose an arbitration, responsive to the overlap, with the other higher priority message.

Example 13. The method of example 8, comprising ingesting the plurality of messages from the communication bus.

Example 14. The method of example 8, wherein the communication bus is an in-vehicle network.

Example 15. A non-transitory computer-readable storage medium, the computer-readable storage medium including instructions that when executed by a computer, cause the computer to: identify, by processing circuitry coupled to a communication bus, a first message from a plurality of messages transmitted on the communication bus as a low priority message; determine, by the processing circuitry, whether the low priority message and second message from the plurality of messages originated from a first electronic control unit (ECU) coupled to the communication bus, the second message a higher priority message than the low priority message; and associate, by the processing circuitry via an ECU message identification (MID) set, an MID of the low priority message and an MID of the higher priority message to the first ECU.

Example 16. The non-transitory computer-readable storage medium of example 15, comprising instructions that when executed by the computer, cause the computer to issue at least one controlled message error on the communication bus against the low priority message to force the low priority message to be retransmitted to cause an overlap between transmission of the low priority message and the higher priority message.

Example 17. The non-transitory computer-readable storage medium of example 16, comprising instructions that when executed by the computer, cause the computer to: determine whether the low priority message lost an arbitration, responsive to the overlap, with the higher priority message; and determine that the low priority message and the higher priority message did not originate from the first ECU based on a determination that the low priority message did lose an arbitration, responsive to the overlap, with the higher priority message.

Example 18. The non-transitory computer-readable storage medium of example 17, comprising instructions that when executed by the computer, cause the computer to determine whether, responsive to the overlap, the high priority message was delayed by the low priority; and determine that the low priority message and the higher priority message did originate from the first ECU based on a determination that the high priority message was delayed by the low priority message.

Example 19. The non-transitory computer-readable storage medium of example 17, comprising instructions that when executed by the computer, cause the computer to: issue at least one secondary controlled message errors on the communication bus against the low priority message to force the low priority message to be retransmitted to cause an overlap between transmission of the low priority message and a third message the plurality of messages, the third message another higher priority message than the low priority message; determine whether the low priority message lost an arbitration, responsive to the overlap, with the other higher priority message; and determine that the low priority message and the other higher priority message did not originate from the first ECU based on a determination that the low priority message did lose an arbitration, responsive to the overlap, with the other higher priority message.

Example 20. The non-transitory computer-readable storage medium of example 15, comprising ingest the plurality of messages from the communication bus.

Example 21. The non-transitory computer-readable storage medium of example 15, wherein the communication bus is an in-vehicle network.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computing apparatus comprising:
    a processor coupled to a communication bus; and
    memory storing instructions, which when executed by the processor configure the apparatus to:
        identify a first message from a plurality of messages transmitted on the communication bus as a low priority message;
        cause overlap in arrival time between the low priority message and a second message from the plurality of messages;
        determine whether the low priority message and the second message from the plurality of messages originated from a first electronic control unit (ECU) coupled to the communication bus, the second message a higher priority message than the low priority message, responsive to the overlap in arrival time; and
        associate a message identification (MID) of the low priority message and an MID of the higher priority message to the first ECU.

2. The computing apparatus of claim 1, the instructions when executed by the processor configure the apparatus to issue at least one controlled message error on the communication bus against the low priority message to indicate that the low priority message was not received properly in order to force the low priority message to be retransmitted to cause an overlap between transmission of the low priority message and the higher priority message.

3. The computing apparatus of claim 2, the instructions when executed by the processor configure the apparatus to:
    determine whether the low priority message lost an arbitration, responsive to the overlap, with the higher priority message; and determine that the low priority message and the higher priority message did not originate from the first ECU based on a determination that the low priority message did lose an arbitration, responsive to the overlap, with the higher priority message.

4. The computing apparatus of claim 3, the instructions when executed by the processor configure the apparatus to:
determine whether, responsive to the overlap, the high priority message was delayed by the low priority; and
determine that the low priority message and the higher priority message did originate from the first ECU based on a determination that the high priority message was delayed by the low priority message.

5. The computing apparatus of claim 3, the instructions when executed by the processor configure the apparatus to:
issue at least one secondary controlled message errors on the communication bus against the low priority message to force the low priority message to be retransmitted to cause an overlap between transmission of the low priority message and a third message the plurality of messages, the third message another higher priority message than the low priority message;
determine whether the low priority message lost an arbitration, responsive to the overlap, with the other higher priority message; and
determine that the low priority message and the other higher priority message did not originate from the first ECU based on a determination that the low priority message did lose an arbitration, responsive to the overlap, with the other higher priority message.

6. The computing apparatus of claim 1, the instructions when executed by the processor configure the apparatus to ingest the plurality of messages from the communication bus.

7. The computing apparatus of claim 1, wherein the communication bus is an in-vehicle network.

8. A method, comprising:
identifying, by processing circuitry coupled to a communication bus, a first message from a plurality of messages transmitted on the communication bus as a low priority message;
causing, by the processing circuitry, overlap in arrival time between the low priority message and a second message from the plurality of messages;
determining, by the processing circuitry, whether the low priority message and the second message from the plurality of messages originated from a first electronic control unit (ECU) coupled to the communication bus, the second message a higher priority message than the low priority message, responsive to the overlap in arrival time; and
associating, by the processing circuitry via an ECU message identification (MID) set, an MID of the low priority message and an MID of the higher priority message to the first ECU.

9. The method of claim 8, comprising issuing at least one controlled message error on the communication bus against the low priority message to indicate that the low priority message was not received properly in order to force the low priority message to be retransmitted to cause an overlap between transmission of the low priority message and the higher priority message.

10. The method of claim 9, comprising:
determining whether the low priority message lost an arbitration, responsive to the overlap, with the higher priority message; and
determining that the low priority message and the higher priority message did not originate from the first ECU based on a determination that the low priority message did lose an arbitration, responsive to the overlap, with the higher priority message.

11. The method of claim 10, comprising:
determining whether, responsive to the overlap, the high priority message was delayed by the low priority; and
determining that the low priority message and the higher priority message did originate from the first ECU based on a determination that the high priority message was delayed by the low priority message.

12. The method of claim 10, comprising:
issuing at least one secondary controlled message errors on the communication bus against the low priority message to force the low priority message to be retransmitted to cause an overlap between transmission of the low priority message and a third message the plurality of messages, the third message another higher priority message than the low priority message;
determining whether the low priority message lost an arbitration, responsive to the overlap, with the other higher priority message; and
determining that the low priority message and the other higher priority message did not originate from the first ECU based on a determination that the low priority message did lose an arbitration, responsive to the overlap, with the other higher priority message.

13. The method of claim 8, comprising ingesting the plurality of messages from the communication bus.

14. The method of claim 8, wherein the communication bus is an in-vehicle network.

15. A non-transitory computer-readable storage medium, the computer-readable storage medium including instructions that when executed by a computer, cause the computer to:
identify, by processing circuitry coupled to a communication bus, a first message from a plurality of messages transmitted on the communication bus as a low priority message;
cause, by the processing circuitry, overlap in arrival time between the low priority message and a second message from the plurality of messages;
determine, by the processing circuitry, whether the low priority message and the second message from the plurality of messages originated from a first electronic control unit (ECU) coupled to the communication bus, the second message a higher priority message than the low priority message, responsive to the overlap in arrival time; and
associate, by the processing circuitry via an ECU message identification (MID) set, an MID of the low priority message and an MID of the higher priority message to the first ECU.

16. The non-transitory computer-readable storage medium of claim 15, comprising instructions that when executed by the computer, cause the computer to issue at least one controlled message error on the communication bus against the low priority message to indicate that the low priority message was not received properly in order to force the low priority message to be retransmitted to cause an overlap between transmission of the low priority message and the higher priority message.

17. The non-transitory computer-readable storage medium of claim 16, comprising instructions that when executed by the computer, cause the computer to:

determine whether the low priority message lost an arbitration, responsive to the overlap, with the higher priority message; and determine that the low priority message and the higher priority message did not originate from the first ECU based on a determination that the low priority message did lose an arbitration, responsive to the overlap, with the higher priority message.

18. The non-transitory computer-readable storage medium of claim 17, comprising instructions that when executed by the computer, cause the computer to:

determine whether, responsive to the overlap, the high priority message was delayed by the low priority; and determine that the low priority message and the higher priority message did originate from the first ECU based on a determination that the high priority message was delayed by the low priority message.

19. The non-transitory computer-readable storage medium of claim 17, comprising instructions that when executed by the computer, cause the computer to:

issue at least one secondary controlled message errors on the communication bus against the low priority message to force the low priority message to be retransmitted to cause an overlap between transmission of the low priority message and a third message the plurality of messages, the third message another higher priority message than the low priority message;

determine whether the low priority message lost an arbitration, responsive to the overlap, with the other higher priority message; and determine that the low priority message and the other higher priority message did not originate from the first ECU based on a determination that the low priority message did lose an arbitration, responsive to the overlap, with the other higher priority message.

20. The non-transitory computer-readable storage medium of claim 15, comprising ingest the plurality of messages from the communication bus.

21. The non-transitory computer-readable storage medium of claim 15, wherein the communication bus is an in-vehicle network.

* * * * *